(12) United States Patent
Toya

(10) Patent No.: US 9,781,552 B2
(45) Date of Patent: Oct. 3, 2017

(54) ELECTRICITY STORAGE DEVICE, METHOD OF CONTROLLING ELECTRICITY STORAGE DEVICE, CHARGING DEVICE, METHOD OF CONTROLLING CHARGING DEVICE, AND WIRELESS CONNECTION SETTING SYSTEM

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/411,339

(22) Filed: Jan. 20, 2017

(65) Prior Publication Data

US 2017/0230783 A1    Aug. 10, 2017

(30) Foreign Application Priority Data

Feb. 10, 2016   (JP) .................................. 2016-024130

(51) Int. Cl.
| | |
|---|---|
| *H04B 5/00* | (2006.01) |
| *H04W 4/00* | (2009.01) |
| *H04W 76/02* | (2009.01) |
| *H02J 7/00* | (2006.01) |
| *H04W 88/08* | (2009.01) |
| *H04W 84/12* | (2009.01) |

(52) U.S. Cl.
CPC .......... *H04W 4/008* (2013.01); *H02J 7/0052* (2013.01); *H04W 76/023* (2013.01); *H02J 2007/0059* (2013.01); *H04W 84/12* (2013.01); *H04W 88/08* (2013.01)

(58) Field of Classification Search
CPC ... H04W 4/008; H04B 5/00; H02J 2007/0062
See application file for complete search history.

(56) References Cited

U.S. PATENT DOCUMENTS

| | | | | |
|---|---|---|---|---|
| 6,603,744 | B2* | 8/2003 | Mizutani ............... | H04W 76/02 370/310 |
| 7,634,670 | B2* | 12/2009 | Nago .................... | G06F 13/385 358/442 |

(Continued)

FOREIGN PATENT DOCUMENTS

JP        2004-222457        8/2004

*Primary Examiner* — Cindy Trandai
(74) *Attorney, Agent, or Firm* — Greenblum & Bernstein, P.L.C.

(57) ABSTRACT

An electricity storage device includes a storage battery charged by a charging device, a first connector that detachably connects the electricity storage device with the charging device, a first communicator that performs wireless communication with an information terminal, a second communicator that performs wired communication with the charging device when the electricity storage device is attached to the charging device via the first connector, and a controller that causes, when the first communicator receives, from the information terminal, a wireless setting value for the charging device to establish wireless connection to a specific access point, the second communicator to transmit the wireless setting value to the charging device.

16 Claims, 9 Drawing Sheets

(56) References Cited

U.S. PATENT DOCUMENTS

| | | | | |
|---|---|---|---|---|
| 8,723,642 B2* | 5/2014 | Park | ............... | G07F 15/006 |
| | | | | 320/103 |
| 9,288,228 B2* | 3/2016 | Suumaki | ............... | H04L 63/18 |
| 9,379,780 B2* | 6/2016 | Widmer | ............... | H04B 5/0037 |
| 9,491,791 B2* | 11/2016 | Hamada | ............... | H04W 76/023 |
| 9,591,436 B2* | 3/2017 | Kurihara | ............... | H04W 8/005 |
| 2005/0272371 A1* | 12/2005 | Komatsuzaki | ............... | H04L 29/06 |
| | | | | 455/41.2 |
| 2010/0057969 A1* | 3/2010 | Meiri | ............... | G06F 1/1632 |
| | | | | 710/303 |
| 2010/0211785 A1* | 8/2010 | Park | ............... | H04L 29/1232 |
| | | | | 713/168 |
| 2012/0057577 A1* | 3/2012 | Dwivedi | ............... | H04W 76/023 |
| | | | | 370/338 |
| 2013/0016032 A1* | 1/2013 | Margulis | ............... | G06F 1/266 |
| | | | | 345/2.3 |
| 2013/0026981 A1* | 1/2013 | Van Der Lee | ............... | H02J 5/005 |
| | | | | 320/108 |
| 2013/0344802 A1* | 12/2013 | Armour | ............... | H04W 84/005 |
| | | | | 455/39 |
| 2014/0075075 A1* | 3/2014 | Morrill | ............... | G06F 1/1632 |
| | | | | 710/303 |
| 2015/0214775 A1* | 7/2015 | Lee | ............... | H02J 7/025 |
| | | | | 320/137 |
| 2015/0332586 A1* | 11/2015 | Hamm | ............... | G08C 17/02 |
| | | | | 340/12.5 |
| 2016/0056669 A1* | 2/2016 | Bell | ............... | G06F 1/26 |
| | | | | 700/286 |
| 2016/0174020 A1* | 6/2016 | Huttunen | ............... | H04B 7/26 |
| | | | | 455/41.2 |
| 2016/0294209 A1* | 10/2016 | Miller | ............... | H02J 7/0054 |

* cited by examiner

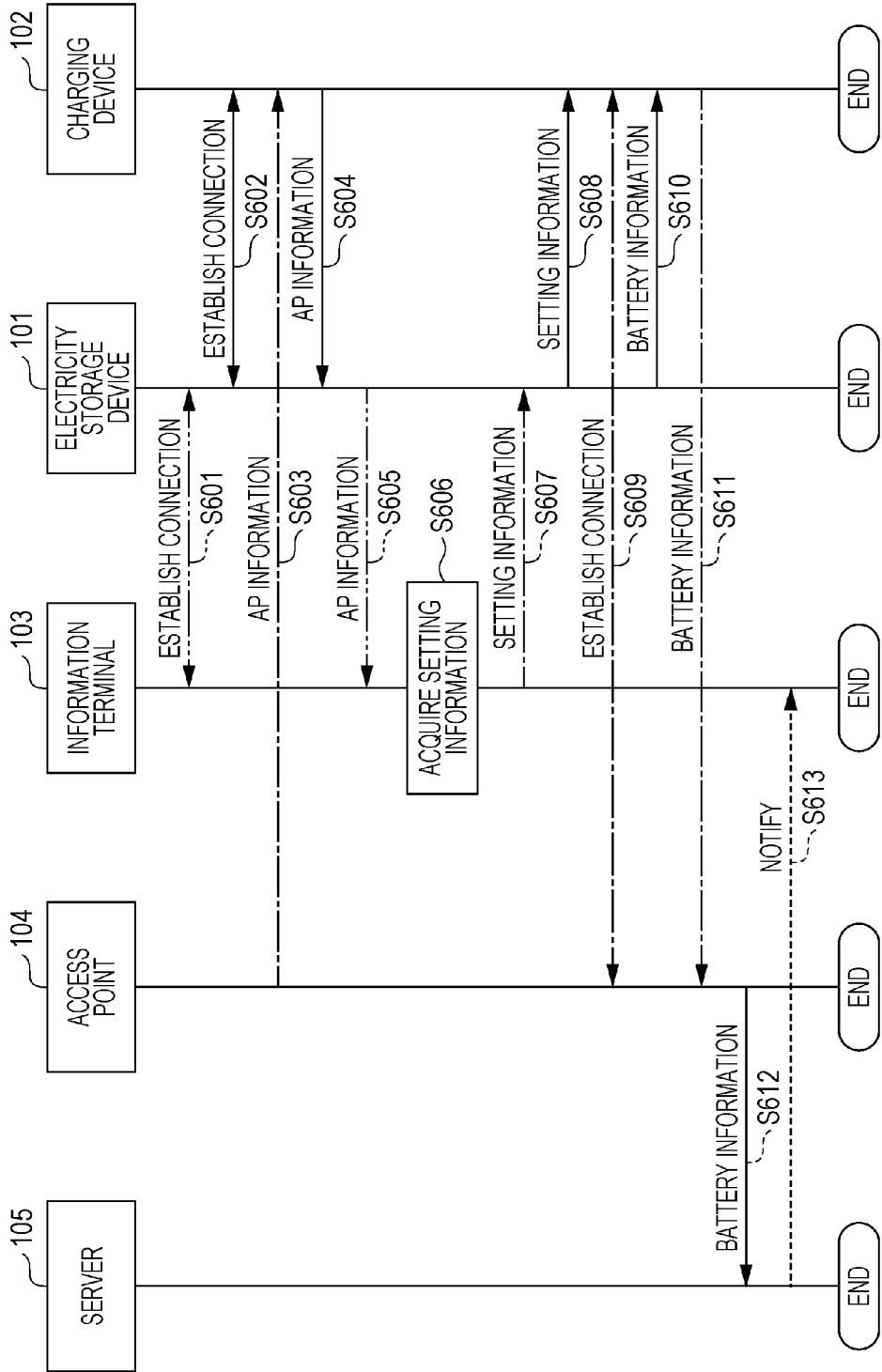

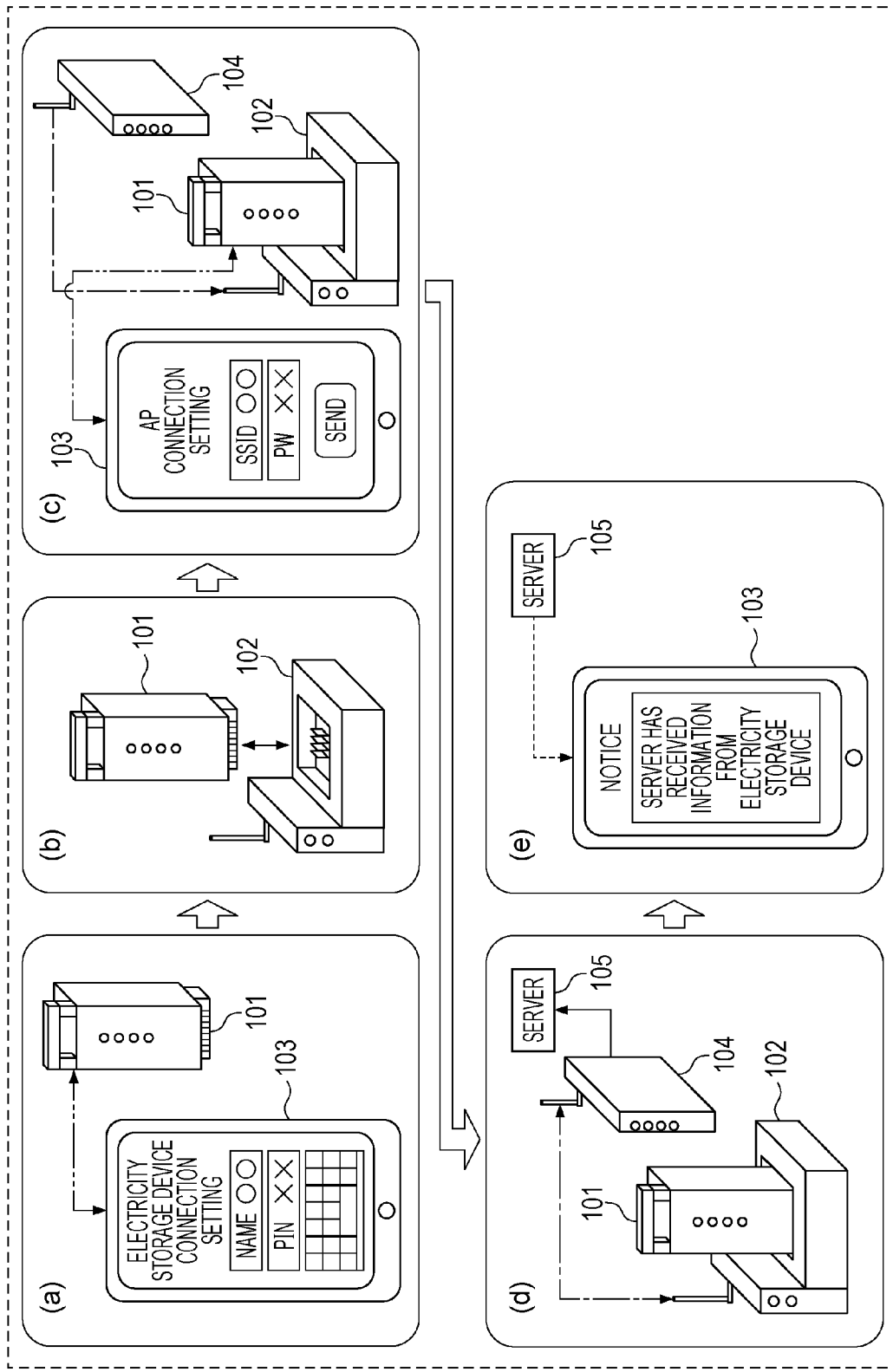

ELECTRICITY STORAGE DEVICE, METHOD OF CONTROLLING ELECTRICITY STORAGE DEVICE, CHARGING DEVICE, METHOD OF CONTROLLING CHARGING DEVICE, AND WIRELESS CONNECTION SETTING SYSTEM

BACKGROUND

1. Technical Field

The present disclosure relates to an electricity storage device, a method of controlling the electricity storage device, a charging device, a method of controlling the charging device, and a wireless connection setting system.

2. Description of the Related Art

There have been proposed various charging systems for charging an electricity storage device. A charging system described in Japanese Unexamined Patent Application Publication No. 2004-222457 is an example of the charging system.

However, in such a charging system, it is not easy to construct an environment for using wireless communication.

SUMMARY

One non-limiting and exemplary embodiment provides an electricity storage device and the like that can assist construction of an environment for using wireless communication.

In one general aspect, the techniques disclosed here feature an electricity storage device including: a storage battery charged by a charging device; a first connector that detachably connects the electricity storage device including the storage battery with the charging device; a first communicator that performs wireless communication with an information terminal; a second communicator that performs wired communication with the charging device when the electricity storage device is attached to the charging device via the first connector; and a controller that causes, when the first communicator receives, from the information terminal, a wireless setting value for the charging device to establish wireless connection to a specific access point, the second communicator to transmit the wireless setting value to the charging device.

It should be noted that general or specific embodiments may be implemented as a system, a method, an integrated circuit, a computer program, a storage medium, or any selective combination thereof.

Note that general or specific embodiments may be implemented as a system, an apparatus, a method, an integrated circuit, a computer program, or a non-transitory storage medium such as a computer-readable CD-ROM or may be realized by any combination of the system, the apparatus, the method, the integrated circuit, the computer program, and the storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Construction of an environment for using wireless communication is assisted by the electricity storage device and the like according to the aspect.

BRIEF DESCRIPTION OF THE DRAWINGS

FIG. 10 is a sequence chart for explaining the operations of the electricity storage device, the charging device, and the like in the second specific example of the embodiment; and FIG. 11 illustrates conceptual diagrams for explaining the operations of the electricity storage device, the charging device, and the like in the second specific example of the embodiment.

Figure 1:
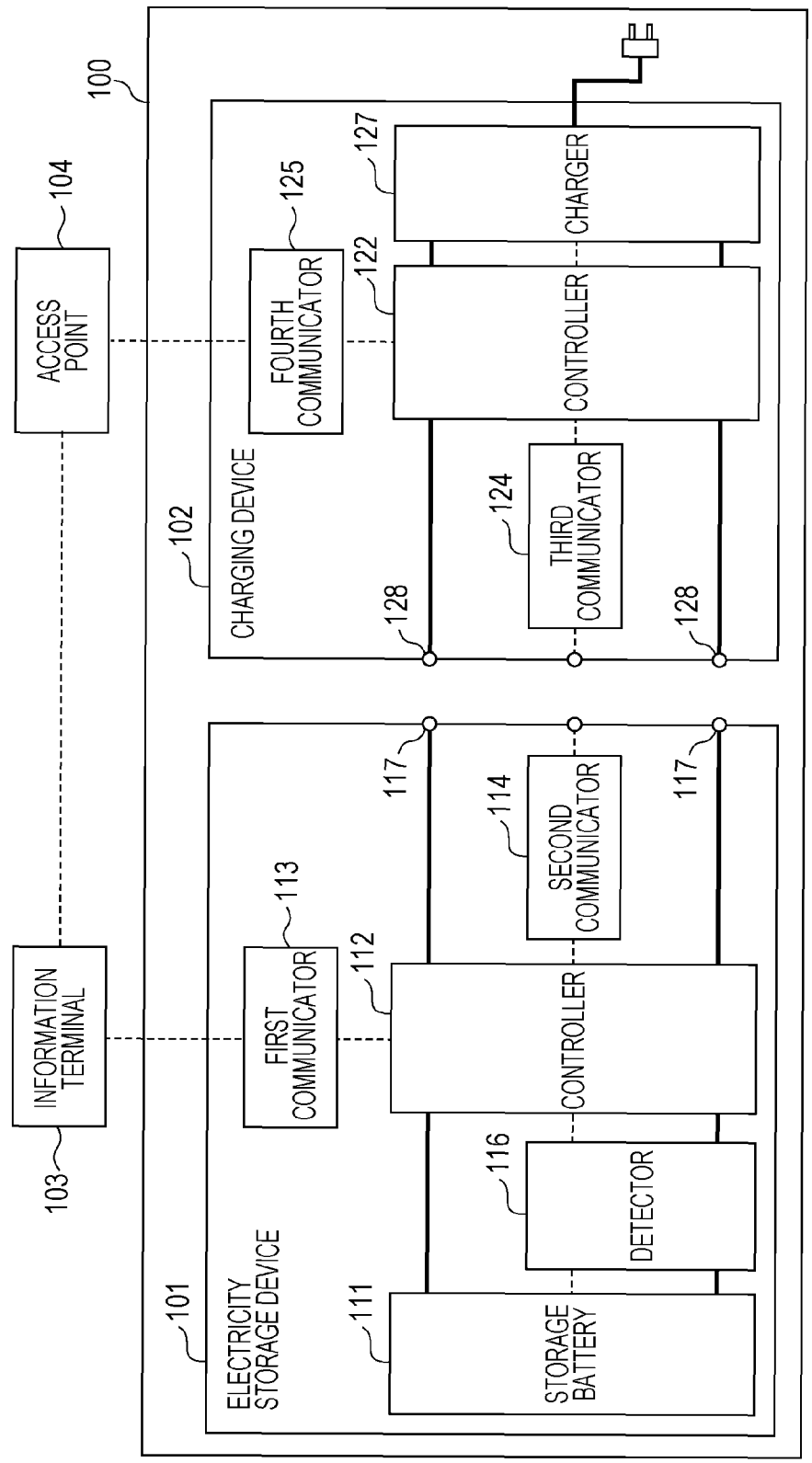
FIG. 1 is a block diagram of a wireless connection setting system in an embodiment.

DETAILED DESCRIPTION (Underlying Knowledge Forming Basis of the Present Disclosure)

The inventor has examined use of wireless communication in a system including an electricity storage device and a charging device, and found the following problem. The problem is specifically explained below.

In recent years, electric apparatuses operated by electricity storage devices have been widely used. An electrically assisted bicycle is an example of the electric apparatuses. For example, a user of an electric apparatus purchases an electricity storage device for operating the electric apparatus and operates the electric apparatus with the purchased electricity storage device. Recently, an electricity storage device rental system has started to be examined for enabling a user of an electric apparatus to borrow an electricity storage device for operating the electric apparatus and operate the electric apparatus with the borrowed electricity storage device.

In order to appropriately manage the electricity storage devices, battery information indicating states of the electricity storage devices has to be collected. On the other hand, since the electricity storage devices are consumables, it is wasteful to mount communicators having high performance on the electricity storage devices. To address this situation, an idea of collecting the battery information via a charging device is now under consideration. For example, a communicator for performing wireless communication with an access point may be mounted on the charging device.

However, in the case of a charging device not including an operation interface, it is not easy to set the charging device to perform wireless communication with an access point and thereby construct an environment for using the wireless communication.

To address this, an electricity storage device according to a first aspect includes: a storage battery charged by a charging device; a first connector that detachably connects the electricity storage device including the storage battery with the charging device; a first communicator that performs wireless communication with an information terminal; a second communicator that performs wired communication with the charging device when the electricity storage device is attached to the charging device via the first connector; and a controller that causes, when the first communicator receives, from the information terminal, a wireless setting value for the charging device to establish wireless connection to a specific access point, the second communicator to transmit the wireless setting value to the charging device.

Consequently, the electricity storage device can receive, from the information terminal, the wireless setting value for the charging device to establish the wireless connection to the specific access point and transmit the wireless setting value to the charging device. Therefore, the electricity storage device can appropriately assist the charging device to establish the wireless connection to the specific access point and appropriately assist construction of an environment for using wireless communication.

In a second aspect, in the electricity storage device in the first aspect, for example, the first communicator may be a communicator that performs Bluetooth (registered trademark) low energy (BLE) communication.

Consequently, the electricity storage device can communicate with the information terminal through the BLE communication. Power consumption for the BLE communication is relatively small. Therefore, the electricity storage device can communicate with the information terminal while suppressing an increase in the power consumption.

In a third aspect, in the electricity storage device in the first aspect or the second aspect, for example, the controller may cause the first communicator to transmit the information on the specific access point to the information terminal when the second communicator receives information on the specific access point from the charging device.

Consequently, the electricity storage device can receive the information on the specific access point from the charging device and transmit the information on the specific access point to the information terminal. Therefore, the electricity storage device can inform the information terminal of the information on the specific access point. After transmitting the information on the specific access point to the information terminal, the electricity storage device can receive the wireless setting value from the information terminal. Therefore, the electricity storage device can receive the wireless setting value from the information terminal at appropriate timing.

A method of controlling an electricity storage device according to a fourth aspect includes: receiving a wireless setting value for a charging device to establish wireless connection to a specific access point, from an information terminal via a first communicator which is provided in the electricity storage device, and is performing wireless communication with the information terminal; and transmitting the wireless setting value to the charging device via a second communicator which is provided in the electricity storage device, and is performing wired communication with the charging device when the electricity storage device is attached to the charging device via a first connector that detachably connects the electricity storage device with the charging device.

Consequently, the electricity storage device can receive, from the information terminal, the wireless setting value for the charging device to establish the wireless connection to the specific access point and transmit the wireless setting value to the charging device. Therefore, the electricity storage device can appropriately assist the charging device to establish the wireless connection to the specific access point and appropriately assist construction of an environment for using wireless communication.

In a fifth aspect, in the method of controlling the electricity storage device in the fourth aspect, for example, the first communicator may be a communicator that performs Bluetooth (registered trademark) low energy (BLE) communication.

Consequently, the electricity storage device can communicate with the information terminal through the BLE communication. Power consumption for the BLE communication is relatively small. Therefore, the electricity storage device can communicate with the information terminal while suppressing an increase in the power consumption.

In a sixth aspect, in the method of controlling the electricity storage device in the fourth aspect or the fifth aspect, for example, the method of controlling the electricity storage device may further include: receiving information on the specific access point from the charging device via the second communicator; and transmitting the information on the specific access point to the information terminal via the first communicator.

Consequently, the electricity storage device can receive the information on the specific access point from the charging device and transmit the information on the specific access point to the information terminal. Therefore, the electricity storage device can inform the information terminal of the information on the specific access point. After transmitting the information on the specific access point to the information terminal, the electricity storage device can receive the wireless setting value from the information terminal. Therefore, the electricity storage device can receive the wireless setting value from the information terminal at appropriate timing.

A charging device according to a seventh aspect includes: a charger that charges an electricity storage device by supplying electric power to the electricity storage device; a second connector that detachably connects the charging device including the charger with the electricity storage device; a third communicator that performs wired communication with the electricity storage device when the electricity storage device is attached to the charging device via the second connector; a fourth communicator that performs wireless communication with an access point; and a controller that causes, when the third communicator receives, from the electricity storage device, a wireless setting value for the charging device to establish wireless connection to a specific access point, the fourth communicator to establish the wireless connection to the specific access point using the wireless setting value.

Consequently, the charging device can receive, from the electricity storage device, the wireless setting value for establishing the wireless connection to the specific access point and establish the wireless connection to the specific access point using the wireless setting value received from the electricity storage device. Therefore, the charging device can appropriately assist construction of an environment for using wireless communication.

In an eighth aspect, in the charging device in the seventh aspect, for example, the fourth communicator may be a communicator that performs Wi-Fi (registered trademark) communication.

Consequently, the charging device can stably communicate with the access point through the Wi-Fi (registered trademark) communication.

In a ninth aspect, in the charging device in the seventh aspect or the eighth aspect, for example, the controller may cause, when the fourth communicator receives information on the specific access point from the specific access point, the third communicator to transmit the information on the specific access point to the electricity storage device.

Consequently, the charging device can receive the information on the specific access point from the specific access point and transmit the information on the specific access point to the electricity storage device. Therefore, the charging device can inform the electricity storage device of the information on the specific access point. After transmitting the information on the specific access point to the electricity storage device, the charging device can receive the wireless setting value from the electricity storage device. Therefore, the charging device can receive the wireless setting value from the electricity storage device at appropriate timing.

A method of controlling a charging device according to a tenth aspect includes: receiving a wireless setting value from an electricity storage device via a third communicator which is provided in the charging device, and is performing wired communication with the electricity storage device at the time when the electricity storage device is attached to the charging device via a second connector that detachably connects the charging device and the electricity storage device; and causing a fourth communicator to establish the wireless connection to the specific access point using the wireless setting value, the forth communicator provided in the charging device, and performing wireless communication with an access point.

Consequently, the charging device can receive, from the electricity storage device, the wireless setting value for establishing the wireless connection to the specific access point and establish the wireless connection to the specific access point using the wireless setting value received from the electricity storage device. Therefore, the charging device can appropriately assist construction of an environment for using wireless communication.

In an eleventh aspect, in the method of controlling the charging device in the tenth aspect, for example, the fourth communicator may be a communicator that performs Wi-Fi (registered trademark) communication.

Consequently, the charging device can stably communicate with the access point through the Wi-Fi (registered trademark) communication.

In a twelfth aspect, in the method of controlling the charging device in the tenth aspect or the eleventh aspect, for example, the control method may further include: receiving information on the specific access point from the specific access point via the fourth communicator; and transmitting the information on the specific access point to the electricity storage device via the third communicator.

Consequently, the charging device can receive the information on the specific access point from the specific access point and transmit the information on the specific access point to the electricity storage device. Therefore, the charging device can inform the electricity storage device of the information on the specific access point. After transmitting the information on the specific access point to the electricity storage device, the charging device can receive the wireless setting value from the electricity storage device. Therefore, the charging device can receive the wireless setting value from the electricity storage device at appropriate timing.

A wireless connection setting system for a charging device according to a thirteenth aspect is a wireless connection setting system including: a charging device; and an electricity storage device attached to the charging device, the electricity storage device including: a storage battery charged by the charging device; a first connector that detachably connects the electricity storage device including the storage battery with the charging device; a first communicator that performs wireless communication with an information terminal; a second communicator that performs wired communication with the charging device when the electricity storage device is attached to the charging device via the first connector; and a first controller that causes, when the first communicator receives, from the information terminal, a wireless setting value for the charging device to establish wireless connection to a specific access point, the second communicator to transmit the wireless setting value to the charging device, and the charging device including: a charger that charges the electricity storage device by supplying electric power to the electricity storage device; a second connector that detachably connects the charging device including the charger with the electricity storage device; a third communicator that performs wired communication with the electricity storage device when the electricity storage device is attached to the charging device via the second connector; a fourth communicator that performs wireless communication with an access point; and a second controller that causes, when the third communicator receives the wireless setting value from the electricity storage device, the fourth communicator to establish the wireless connection to the specific access point using the wireless setting value.

Consequently, the electricity storage device can receive, from the information terminal, the wireless setting value for the charging device to establish the wireless connection to the specific access point and transmit the wireless setting value to the charging device. The charging device can receive the wireless setting value from the electricity storage device and establish the wireless connection to the specific access point using the wireless setting value received from the electricity storage device. Therefore, the wireless connection setting system including the electricity storage device and the charging device can appropriately support construction of an environment for using wireless communication.

In a fourteenth aspect, in the wireless connection setting system in the thirteenth aspect, for example, power consumption of the first communicator may be smaller than power consumption of the fourth communicator.

Consequently, the wireless connection setting system can receive the wireless setting value from the information terminal with relatively small power consumption. Therefore, the wireless connection setting system can appropriately support construction of an environment for using wireless communication while suppressing an increase in the power consumption.

In a fifteenth aspect, in the wireless communication setting system in the fourteenth aspect, for example, the first communicator may be a communicator that performs Bluetooth (registered trademark) low energy (BLE) communication and the fourth communicator may be a communicator that performs Wi-Fi (registered trademark) communication.

Consequently, the electricity storage device can communicate with the information terminal while suppressing an increase in the power consumption through the BLE communication. The charging device can stably communicate with the access point though the Wi-Fi (registered trademark) communication. Therefore, the wireless connecting system including the electricity storage device and the charging device can appropriately assist construction of an environment for using wireless communication and stably communicate with the access point while suppressing an increase in the power consumption.

In a sixteenth aspect, in the wireless connection setting system in any one of the thirteenth aspect to the fifteenth aspect, for example, when the fourth communicator receives information on the specific access point from the specific access point, the second controller may cause the third communicator to transmit the information on the specific access point to the electricity storage device. When the second communicator receives the information on the specific access point from the charging device, the first controller may cause the first communicator to transmit the information on the specific access point to the information terminal.

Consequently, the charging device can receive the information on the specific access point from the specific access point and transmit the information on the specific access point to the electricity storage device. The electricity storage device can receive the information on the specific access point from the charging device and transmit the information on the specific access point to the information terminal. Therefore, the charging device can inform the electricity storage device of the information on the specific access point. The electricity storage device can inform the information terminal of the information on the specific access point.

The electricity storage device can receive the wireless setting value from the information terminal after transmitting the information on the specific access point to the information terminal. The charging device can receive the wireless setting value from the electricity storage device after transmitting the information on the specific access point to the electricity storage device. Therefore, the electricity storage device and the charging device can receive the wireless setting value from the information terminal at appropriate timing.

Note that general or specific embodiments may be implemented as a system, an apparatus, a method, an integrated circuit, a computer program, or a non-transitory storage medium such as a computer-readable CD-ROM or may be realized by any combination of the system, the apparatus, the method, the integrated circuit, the computer program, and the storage medium.

An embodiment is specifically explained with reference to the drawings. Note that the embodiment explained below indicates a general or specific example. Numerical values, shapes, materials, components, disposition positions and connection forms of the components, steps, orders of steps, and the like described in the following embodiment are examples and are not intended to limit the present disclosure. Among the components in the following embodiment, components not described in independent claims indicating most significant concepts are explained as any components.

In representation, ordinal numbers such as first, second, and third may be added to the components and the like, may be replaced, or may be removed.

Embodiment

FIG. 1 is a block diagram of a wireless connection setting system in an embodiment. A wireless connection setting system 100 illustrated in FIG. 1 includes an electricity storage device 101 and a charging device 102. Further, in FIG. 1, an information terminal 103 and an access point 104 are illustrated.

The electricity storage device 101 is an example of the electricity storage device of the present disclosure and is an electricity storage device in which charging and discharging are performed. The electricity storage device 101 is also called storage battery pack. The electricity storage device 101 is attached to the charging device 102 and charged. Specifically, the electricity storage device 101 includes a storage battery 111, a controller 112, a first communicator 113, a second communicator 114, and a first connector 117.

The storage battery 111 is an example of the storage battery of the present disclosure and is a storage battery that stores electric energy. For example, the storage battery 111 is charged by the charging device 102. The storage battery 111 is also called secondary cell or rechargeable battery. The storage battery 111 may be a cell, may be a unit cell, may be a battery block, or may be a battery pack.

The controller 112 is an example of the controller or the first controller of the present disclosure and is a controller that controls the operation of the entire electricity storage device 101. The controller 112 may include an arithmetic processor or a storage device. The arithmetic processor of the controller 112 may be a MPU or a CPU. The storage device of the controller 112 may be a volatile memory or may be a nonvolatile memory. The controller 112 may be configured by an independent controller that performs concentrated control or may be configured by a plurality of controllers that perform distributed control in cooperation with one another.

For example, when the first communicator 113 receives a wireless setting value from the information terminal 103, the controller 112 causes the second communicator 114 to transmit the wireless setting value to the charging device 102. When the second communicator 114 receives information on the access point 104 from the charging device 102, the controller 112 may cause the first communicator 113 to transmit the information on the access point 104 to the information terminal 103. Note that the wireless setting value is setting information for the charging device 102 to establish wireless connection to the access point 104.

For example, the controller 112 may transmit commands to components of the electricity storage device 101 to thereby control the operation of the entire electricity storage device 101. In this case, the components of the electricity storage device 101 receive the commands transmitted from the controller 112 and operate according to the commands.

For example, the controller 112 may include a converter that controls charging or discharging of the storage battery 111. The controller 112 may acquire an instruction for charging from the charging device 102 via the second communicator 114 and control the charging of the storage battery 111 according to the instruction for charging. The controller 112 may acquire a state of the storage battery 111 and control the charging or the discharging of the storage battery 111 according to the state of the storage battery 111.

For example, the controller 112 may notify the information terminal 103 of the state of the storage battery 111 via the first communicator 113. Consequently, the controller 112 can inform a user of the state of the storage battery 111. The controller 112 may notify the charging device 102 of the state of the storage battery 111.

The first communicator 113 is an example of the first communicator of the present disclosure and is a communicator that performs wireless communication with the information terminal 103. The first communicator 113 may be a processing circuit including a communication interface. For example, the first communicator 113 may include an antenna for the wireless communication.

Specifically, the first communicator 113 performs the wireless communication with the information terminal 103 according to control performed by the controller 112. For example, the first communicator 113 receives the wireless setting value from the information terminal 103. The first communicator 113 may transmit the information on the access point 104 to the information terminal 103. The first communicator 113 may transmit battery information indicating the state of the storage battery 111 to the information terminal 103.

The first communicator 113 may be a communicator that performs Bluetooth (registered trademark) low energy (BLE) communication. The BLE corresponds to a version 4 of Bluetooth (registered trademark), which is the short range wireless communication standard. Power consumption for the BLE communication is relatively small. Since the first communicator 113 performs the BLE communication, power consumption is suppressed. Note that the Bluetooth (registered trademark) corresponds to the IEEE802.15.1 standard, which is the international standard of short range wireless communication.

The second communicator 114 is an example of the second communicator of the present disclosure and is a communicator that is communicatively connected to the charging device 102 during the attachment of the electricity storage device 101 to the charging device 102 and performs the wired communication with the charging device 102. The second communicator 114 may be a processing circuit including a communication interface. For example, the second communicator 114 may include a connection terminal for the wired communication. Specifically, the second communicator 114 performs the wired communication with the charging device 102 according to the control performed by the controller 112.

For example, the second communicator 114 transmits the wireless setting value to the charging device 102. The second communicator 114 may receive the information on the access point 104 from the charging device 102.

The first connector 117 detachably connects the electricity storage device 101 and the charging device 102. The first connector 117 includes a power receiving terminal that receives electric power supplied from the charging device 102. In FIG. 1, the power receiving terminal is indicated by a white circle. The first connector 117 may be configured integrally with a connection terminal (a communication terminal) for the wired communication of the second communicator 114. In FIG. 1, the connection terminal (the communication terminal) for the wired communication of the second communicator 114 is indicated by a white circle on an electric path connected to the second communicator 114. The first connector 117 is an example of the first connector of the present disclosure.

The charging device 102 is an example of the charging device of the present disclosure and is a charging device that charges the electricity storage device 101. For example, the charging device 102 converts AC power supplied from a power system into DC power having a predetermined voltage and supplies the DC power having the predetermined voltage to the electricity storage device 101 to thereby charge the electricity storage device 101. More specifically, the charging device 102 charges the storage battery of the electricity storage device 101. In this embodiment, the charging device 102 includes a controller 122, a third communicator 124, a fourth communicator 125, a charger 127, and a second connector 128.

The controller 122 is an example of the controller or the second controller of the present disclosure and is a controller that controls the operation of the entire charging device 102. The controller 122 may include an arithmetic processor and a storage device. The arithmetic processor of the controller 122 may be a MPU or a CPU. The storage device of the controller 122 may be a volatile memory or may be a nonvolatile memory. The controller 122 may be configured by an independent controller that performs concentrated control or may be configured by a plurality of controllers that perform distributed control in cooperation with one another.

For example, when the third communicator 124 receives the wireless setting value from the electricity storage device 101, the controller 122 causes the fourth communicator 125 to establish wireless connection to the access point 104 using the wireless setting value. When the fourth communicator 125 receives the information on the access point 104 from the access point 104, the controller 122 may cause the third communicator 124 to transmit the information on the access point 104 to the electricity storage device 101.

For example, the controller 122 may transmit commands to components of the charging device 102 to thereby control the operation of the entire charging device 102. In this case, the components of the charging device 102 receive the commands from the controller 122 and operate according to the commands.

The controller 122 may include a converter that controls charging of the electricity storage device 101. The controller 122 may transmit an instruction for charging to the electricity storage device 101 via the third communicator 124 to thereby control the charging of the electricity storage device 101.

For example, the controller 122 may acquire the state of the storage battery 111 from the electricity storage device 101 via the third communicator 124 and control the charging of the electricity storage device 101 according to the state of the storage battery 111. The controller 122 may notify a server of the state of the storage battery 111 via the fourth communicator 125 or the like.

The third communicator 124 is an example of the third communicator of the present disclosure and is a communicator that is communicatively connected to the electricity storage device 101 during the attachment of the electricity storage device 101 to the charging device 102 and performs the wired communication with the electricity storage device 101. The third communicator 124 may be a processing circuit including a communication interface. For example, the third communicator 124 may include a connection terminal for the wired communication. Specifically, the third communicator 124 performs the wired communication with the electricity storage device 101 according to the control performed by the controller 122.

For example, the third communicator 124 receives the wireless setting value from the electricity storage device 101. The third communicator 124 may transmit the information on the access point 104 to the electricity storage device 101.

The fourth communicator 125 is an example of the fourth communicator of the present disclosure and is a communicator that performs the wireless communication with the access point 104, other access points, or the like. The fourth communicator 125 may be a processing circuit including a communication interface. For example, the fourth communicator 125 may include an antenna for the wireless communication. Specifically, the fourth communicator 125 performs the wireless communication with the access point 104 according to the control performed by the controller 122.

For example, the fourth communicator 125 establishes the wireless communication with the access point 104 using the wireless setting value. The fourth communicator 125 may receive the information on the access point 104 from the access point 104.

The fourth communicator 125 may be a communicator that performs Wi-Fi (registered trademark) communication. The Wi-Fi (registered trademark) is the wireless communication standard and corresponds to the wireless LAN (Local Area Network) and, more specifically, corresponds to the IEEE802.11 standard, which is the international standard of the wireless communication.

Power consumption for the Wi-Fi (registered trademark) communication is larger than power consumption for the BLE communication. On the other hand, a communication distance of the Wi-Fi (registered trademark) communication is longer than a communication distance of the BLE communication. Communication speed of the Wi-Fi (registered trademark) communication is higher than communication speed of the BLE communication. The fourth communicator 125 can stably perform the wireless communication with the access point 104 by performing the Wi-Fi (registered trademark) communication.

The charger 127 charges the electricity storage device 101 by supplying electric power to the electricity storage device 101. The charger 127 supplies electric power to the electricity storage device 101 using electric power obtained from an external power supply. Examples of the external power supply include a commercial power supply and distributed power supplies such as a solar battery, a fuel battery, and a storage battery. The charger 127 includes a power converter that converts a voltage of the electric power obtained from the external power supply. Examples of the power converter include a DC/DC converter and an AC/AC converter. The charger 127 is an example of the charger of the present disclosure.

The second connector 128 detachably connects the electricity storage device 101 and the charging device 102. The first connector 117 includes a power transmitting terminal that transmits electric power to the electricity storage device 101. In FIG. 1, the power transmitting terminal is indicated by a white circle. The first connector 117 and the second connector 128 are connected, whereby the electricity storage device 101 is attached to the charging device 102. At this point, the electricity storage device 101 and the charging device 102 are electrically connected via the power receiving terminal provided in the first connector 117 and the power transmitting terminal provided in the second connector 128. The second connector 128 may be configured integrally with a connection terminal (a communication terminal) for the wired communication of the third communicator 124. In FIG. 1, the connection terminal (the communication terminal) for the wired communication of the third communicator 124 is indicated by a white circle on an electric path connected to the third communicator 124. The second connector 128 is an example of the second connector of the present disclosure.

The information terminal 103 is a device communicable with the electricity storage device 101 and is a device capable of inputting the wireless setting value and the like. For example, the information terminal 103 includes a communication interface and an operation interface. The information terminal 103 may be an information processing apparatus such as a computer. More specifically, the information terminal 103 may be a portable terminal, may be a cellular phone, or may be a smartphone.

For example, the information terminal 103 performs the wireless communication with the electricity storage device 101. When performing the wireless communication with the electricity storage device 101, the information terminal 103 may perform the BLE communication. The information terminal 103 may establish wireless connection to the access point 104 using the wireless setting value and perform the wireless communication with the access point 104. When performing the wireless communication with the access point 104, the information terminal 103 may perform the Wi-Fi (registered trademark) communication.

The information terminal 103 may receive an input of the wireless setting value. The information terminal 103 may transmit the wireless setting value to the electricity storage device 101. The information terminal 103 may receive the information on the access point 104 from the access point 104 or the electricity storage device 101.

The access point 104 is a device that relays communication. The access point 104 may be a communication device such as a router or a bridge.

For example, the access point 104 may establish wireless connection of the charging device 102 and the information terminal 103 using the wireless setting value and perform the wireless communication with the charging device 102 and the information terminal 103. When performing the wireless communication with the charging device 102 and the information terminal 103, the access point 104 may perform the Wi-Fi (registered trademark) communication. The access point 104 may perform the wired communication with the server. The access point 104 may transmit the information on the access point 104 to the charging device 102 or the information terminal 103.

Figure 2:
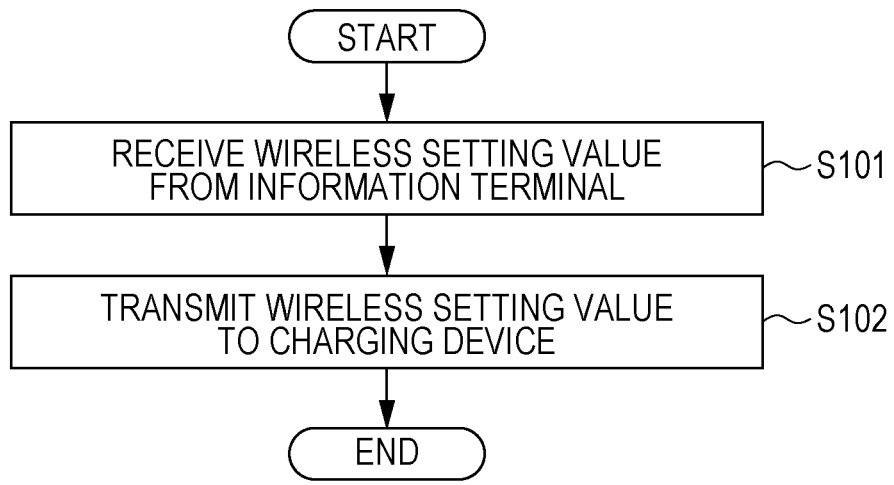
FIG. 2 is a flowchart for explaining a first operation example of an electricity storage device in the embodiment.

FIG. 2 is a flowchart for explaining a first operation example of the electricity storage device 101 illustrated in FIG. 1. In the first operation example, the first communicator 113 receives, from the information terminal 103, a wireless setting value for the charging device 102 to establish wireless connection to the access point 104 (S101). For example, the first communicator 113 receives the wireless setting value from the information terminal 103 through the BLE communication.

When the first communicator 113 receives the wireless setting value from the information terminal 103, the controller 112 causes the second communicator 114 to transmit the wireless setting value to the charging device 102. The second communicator 114 transmits the wireless setting value to the charging device 102 according to the control performed by the controller 112 (S102). For example, the second communicator 114 transmits the wireless setting value to the charging device 102 through the wired communication.

Consequently, the electricity storage device 101 can receive, from the information terminal 103, the wireless setting value for the charging device 102 to establish wireless connection to the access point 104 and transmit the wireless setting value to the charging device 102. Therefore, the electricity storage device 101 can appropriately assist the charging device 102 to establish wireless connection to the access point 104 and can appropriately assist construction of an environment for using wireless communication.

Figure 3:
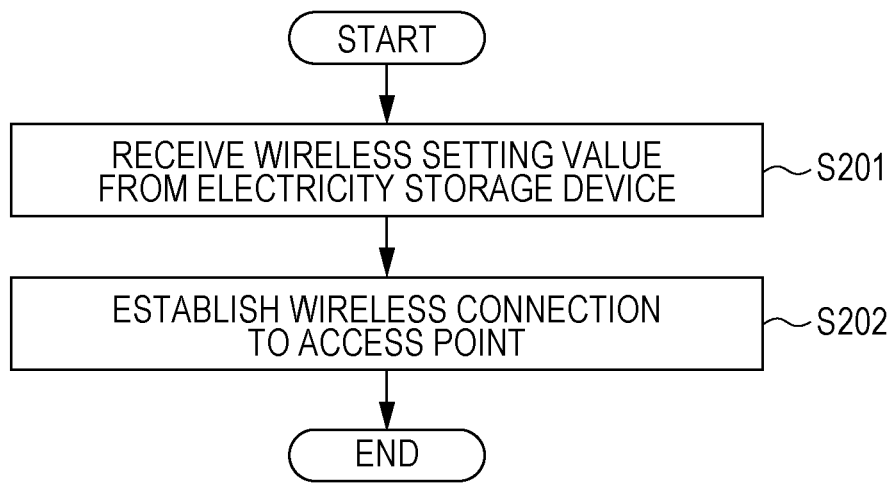
FIG. 3 is a flowchart for explaining a first operation example of a charging device in the embodiment.

FIG. 3 is a flowchart for explaining a first operation example of the charging device 102 illustrated in FIG. 1. In the first operation example, the third communicator 124 receives, from the electricity storage device 101, the wireless setting value for the charging device 102 to establish wireless connection to the access point 104 (S201). For example, the third communicator 124 receives the wireless setting value from the electricity storage device 101 through the wired communication.

When the third communicator 124 receives the wireless setting value from the electricity storage device 101, the controller 122 causes the fourth communicator 125 to establish wireless connection to the access point 104 using the wireless setting value. The fourth communicator 125 establishes wireless connection to the access point 104 according to the control performed by the controller 122 (S202). For example, the fourth communicator 125 establishes wireless connection of the Wi-Fi (registered trademark) communication to the access point 104.

Consequently, the charging device 102 can receive, from the electricity storage device 101, the wireless setting value for establishing wireless connection to the access point 104 and establish wireless connection to the access point 104 using the wireless setting value received from the electricity storage device 101. Therefore, the charging device 102 can appropriately assist construction of an environment for using wireless communication.

Figure 4:
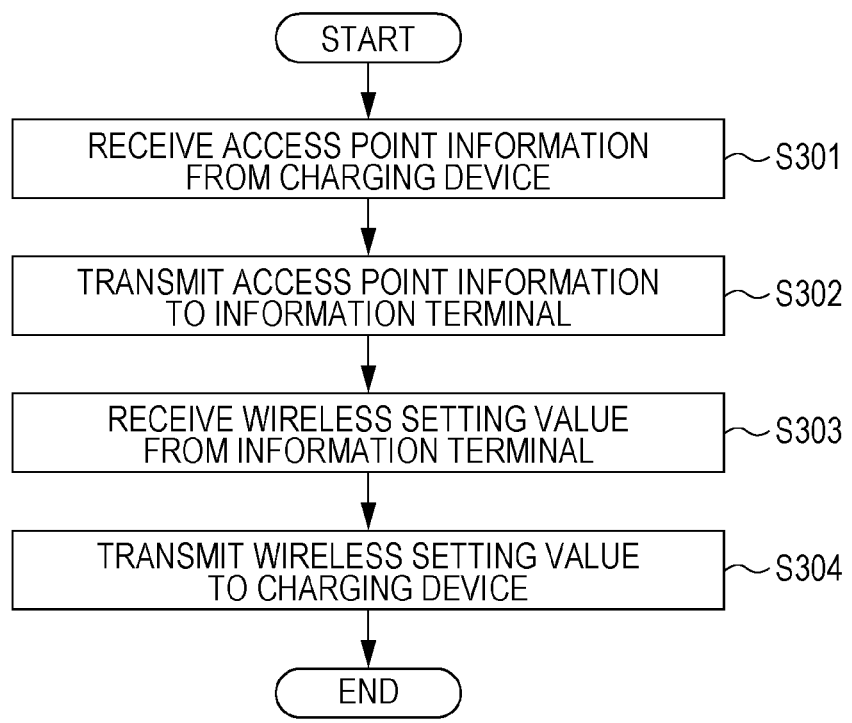
FIG. 4 is a flowchart for explaining a second operation example of the electricity storage device in the embodiment.

FIG. 4 is a flowchart for explaining a second operation example of the electricity storage device 101 illustrated in FIG. 1. In the second operation example, the second communicator 114 receives the information on the access point 104 from the charging device 102 (S301). For example, the second communicator 114 receives the information on the access point 104 from the charging device 102 through the wired communication.

When the second communicator 114 receives the information on the access point 104 from the charging device 102, the controller 112 causes the first communicator 113 to transmit the information on the access point 104 to the information terminal 103. The first communicator 113 transmits the information on the access point 104 to the information terminal 103 according to the control performed by the controller 112 (S302). For example, the first communicator 113 transmits the information on the access point 104 to the information terminal 103 through the BLE communication.

After transmitting the information on the access point 104 to the information terminal 103, as in the first operation example, the first communicator 113 receives, from the information terminal 103, the wireless setting value for the charging device 102 to establish wireless connection to the access point 104 (S303).

When the first communicator 113 receives the wireless setting value from the information terminal 103, the controller 112 causes the second communicator 114 to transmit the wireless setting value to the charging device 102. The second communicator 114 transmits the wireless setting value to the charging device 102 according to the control performed by the controller 112 (S304).

Consequently, the electricity storage device 101 can receive the information on the access point 104 from the charging device 102 and transmit the information on the access point 104 to the information terminal 103. Therefore, the electricity storage device 101 can inform the information terminal 103 of the information on the access point 104.

After transmitting the information on the access point 104 to the information terminal 103, the electricity storage device 101 can receive the wireless setting value from the information terminal 103. Therefore, the electricity storage device 101 can receive the wireless setting value from the information terminal 103 at appropriate timing. The electricity storage device 101 can transmit the wireless setting value to the charging device 102. Therefore, the electricity storage device 101 can appropriately assist construction of an environment for using wireless communication.

Figure 5:
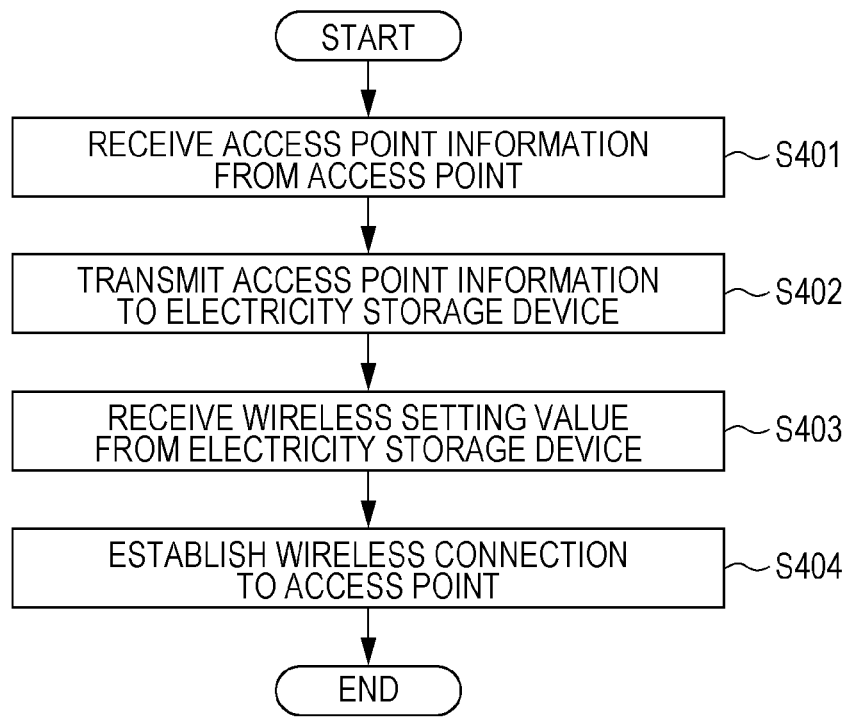
FIG. 5 is a flowchart for explaining a second operation example of the charging device in the embodiment.

FIG. 5 is a flowchart for explaining a second operation example of the charging device 102 illustrated in FIG. 1. In the second operation example, the fourth communicator 125 receives the information on the access point 104 from the access point 104 (S401). For example, the fourth communicator 125 receives the information on the access point 104 from the access point 104 through the Wi-Fi (registered trademark) communication in a state in which connection is not established.

When the fourth communicator 125 receives the information on the access point 104 from the access point 104, the controller 122 causes the third communicator 124 to transmit the information on the access point 104 to the electricity storage device 101. The third communicator 124 transmits the information on the access point 104 to the electricity storage device 101 according to the control performed by the controller 122 (S402). For example, the third communicator 124 transmits the information on the access point 104 to the electricity storage device 101 through the wired communication.

After transmitting the information on the access point 104 to the electricity storage device 101, as in the first operation example, the third communicator 124 receives, from the electricity storage device 101, the wireless setting value for the charging device 102 to establish wireless connection to the access point 104 (S403).

When the third communicator 124 receives the wireless setting value from the electricity storage device 101, the controller 122 causes the fourth communicator 125 to establish wireless connection to the access point 104 using the wireless setting value. The fourth communicator 125 establishes the wireless connection to the access point 104 according to the control performed by the controller 122 (S404).

Consequently, the charging device 102 can receive the information on the access point 104 from the access point 104 and transmit the information on the access point 104 to the electricity storage device 101. Therefore, the charging device 102 can inform the electricity storage device 101 of the information on the access point 104.

After transmitting the information on the access point 104 to the electricity storage device 101, the charging device 102 can receive the wireless setting value from the electricity storage device 101. Therefore, the charging device 102 can receive the wireless setting value from the electricity storage device 101 at appropriate timing. The charging device 102 can establish wireless connection to the access point 104 using the wireless setting value received from the electricity storage device 101. Therefore, the charging device 102 can appropriately assist construction of an environment for using wireless communication.

A more specific configuration example and a more specific operation example of the wireless connection setting system 100 and the like illustrated in FIG. 1 are explained as a first specific example and a second specific example.

First Specific Example

Figure 6:
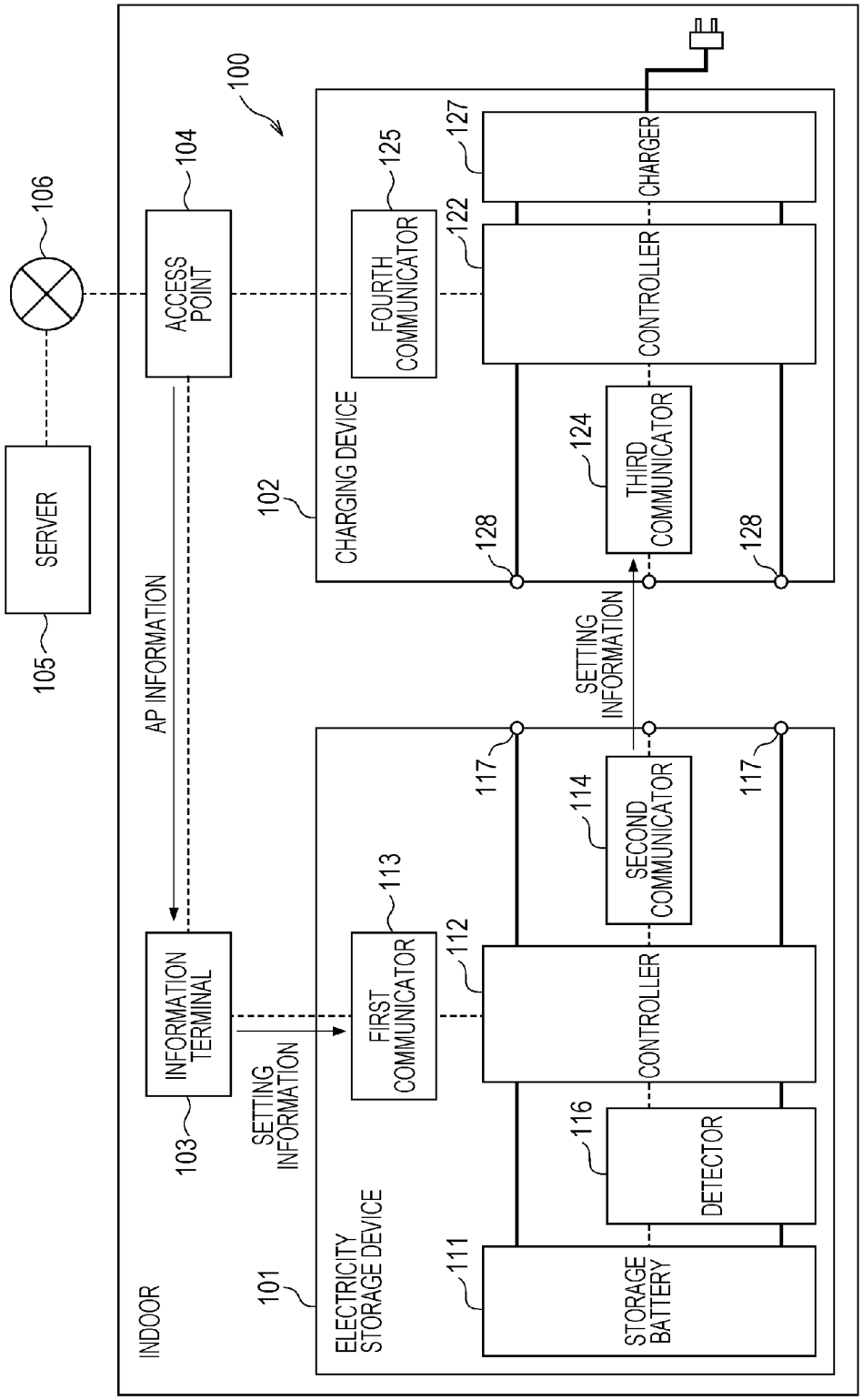
FIG. 6 is a block diagram of the wireless connection setting system in a first specific example of the embodiment.

FIG. 6 is a block diagram illustrating the first specific example of the wireless connection setting system 100 illustrated in FIG. 1. In this specific example, the wireless connection setting system 100 includes the electricity storage device 101 and the charging device 102 as in the example illustrated in FIG. 1. The electricity storage device 101, the charging device 102, the information terminal 103, and the access point 104 are used indoors but may be carried out outdoors and used. Note that, in FIG. 6, dotted lines among the components indicate a transmission path of the wired communication or the wireless communication. Thick lines among the components indicate a power line.

As in the example illustrated in FIG. 1, the electricity storage device 101 includes the storage battery 111, the controller 112, the first communicator 113, and the second communicator 114. In this specific example, the electricity storage device 101 further includes a detector 116. The detector 116 may be included in the controller 112.

The detector 116 is a component for detecting a state of the storage battery 111. For example, the detector detects a charging voltage, a discharging voltage, internal resistance, and the like of the storage battery 111. Specifically, the detector 116 may be a voltmeter or an ammeter.

For example, information obtained by the detector 116 is transmitted to a server 105 via the controller 112, the second communicator 114, the third communicator 124, the controller 122, the fourth communicator 125, the access point 104, and a communication network 106. In the server 105, the information obtained by the detector 116 is stored. Consequently, battery information indicating a state of the storage battery 111 is stored in the server 105. The electricity storage device 101 is appropriately managed.

As in the example illustrated in FIG. 1, the charging device 102 includes the controller 122, the third communicator 124, and the fourth communicator 125. In this specific example, the charging device 102 further includes the charger 127. The charger 127 may be included in the controller 122.

The charger 127 is a component for supplying electric power to the electricity storage device 101. Specifically, the charger 127 is an electric circuit for supplying electric power to the electricity storage device 101 from a power circuit. The charger 127 may include a converter that controls charging of the electricity storage device 101. For example, the charger 127 converts AC power supplied to the power system into DC power having a predetermined voltage and supplies the DC power having the predetermined voltage to the electricity storage device 101 according to the control performed by the controller 122. Consequently, the electricity storage device 101 is charged.

In this specific example, the access point 104 performs the wireless communication with the charging device 102 and the information terminal 103. The access point 104 performs the wired communication with the server 105 via the communication network 106. Consequently, the access point 104 may relay communication between the charging device 102 and the server 105 or may relay communication between the information terminal 103 and the server 105.

The server 105 is an apparatus for managing the electricity storage device 101. The server 105 may be an information processing apparatus such as a computer. The server 105 may be configured by a plurality of devices. For example, the server 105 is capable of communicating with the access point 104 via the communication network 106. The server 105 and the charging device 102 may communicate with each other via the access point 104. The server 105 and the information terminal 103 may communicate with each other via the access point 104.

The server 105 and the information terminal 103 may communicate with each other not via the access point 104. For example, the server 105 and the information terminal 103 may communicate with each other on the basis of a communication standard used in a mobile communication system such as the third generation mobile communication system (3G), the fourth generation mobile communication system (4G), or LTE (registered trademark). More specifically, international mobile telecommunications (IMT)-2000, IMT-Advanced, or the like may be used.

The communication network 106 is a network for various communication devices to communicate. The communication network 106 may be a general-purpose network such as the Internet or may be a dedicated network.

In this specific example, the BLE communication is used between the electricity storage device 101 and the information terminal 103. The Wi-Fi (registered trademark) communication is used between the charging device 102 and the access point 104. The Wi-Fi (registered trademark) communication is used between the information terminal 103 and the access point 104. The wired communication is used between the electricity storage device 101 and the charging device 102.

Wireless connection for the BLE communication used between the electricity storage device 101 and the information terminal 103 is appropriately established on the basis of information input via the operation interface of the information terminal 103. Wireless connection for the Wi-Fi (registered trademark) communication used between the information terminal 103 and the access point 104 is also appropriately established on the basis of the information input via the operation interface of the information terminal 103. Wired connection for the wired communication used between the electricity storage device 101 and the charging device 102 is appropriately established by physical connection.

However, it is not easy to establish wireless connection for the Wi-Fi (registered trademark) communication used between the charging device 102 and the access point 104. Therefore, the electricity storage device 101 receives, from the information terminal 103, setting information for the charging device 102 to establish wired connection to the access point 104 and transmits the received setting information to the charging device 102. The charging device 102 receives setting information from the electricity storage device 101 and establishes wireless connection to the access point 104 using the received setting information.

Specifically, the information terminal 103 receives access point information (AP information), which is the information on the access point 104, from the access point 104. The access point information may be information indicating the access point 104. That is, the access point information may include information for identifying the access point 104. The access point information may include, for example, a service set identifier (SSID), an authentication system, and an encryption system used in the Wi-Fi (registered trademark) communication.

The information terminal 103 may receive the access point information in communication for establishing wireless connection of the Wi-Fi communication between the information terminal 103 and the access point 104. The information terminal 103 acquires setting information on the basis of, for example, an input to the operation interface of the information terminal 103. The setting information may include, for example, a setting value of the SSID, a setting value of the authentication system, a setting value of the encryption system, and a password used for establishing the Wi-Fi (registered trademark) communication.

That is, the setting information may be information obtained by adding information such as the password to the setting values for the access point information. Specifically, the information terminal 103 may receive an input of a password or the like corresponding to the setting value of the SSID received as the access point information and combine the setting value of the SSID, the password, and the like to acquire setting information including the setting value of the SSID, the password, and the like.

The information terminal 103 transmits the setting information to the electricity storage device 101 through the BLE communication. The first communicator 113 of the electricity storage device 101 receives the setting information from the information terminal 103 through the BLE communication. The second communicator 114 of the electricity storage device 101 transmits the setting information to the charging device 102 through the wired communication. The third communicator 124 of the charging device 102 receives the setting information from the electricity storage device 101 through the wired communication. The fourth communicator 125 of the charging device 102 establishes wireless connection of the Wi-Fi (registered trademark) communication between the charging device 102 and the access point 104 using the setting information.

Consequently, the setting information for establishing the wireless connection of the Wi-Fi (registered trademark) communication between the charging device 102 and the access point 104 is acquired by the information terminal 103 and transmitted to the charging device 102 via the electricity storage device 101. The wireless connection of the Wi-Fi (registered trademark) communication between the charging device 102 and the access point 104 is established on the basis of the setting information transmitted to the charging device 102.

Therefore, the charging device 102 can establish the wireless connection of the Wi-Fi (registered trademark) communication between the charging device 102 and the access point 104 even if the charging device 102 does not include the operation interface. As the first communicator 113, the second communicator 114, and the third communicator 124, a communicator for transmitting and receiving the battery information indicating the state of the storage battery 111 may be used. Consequently, an increase of components is suppressed.

Figure 7:
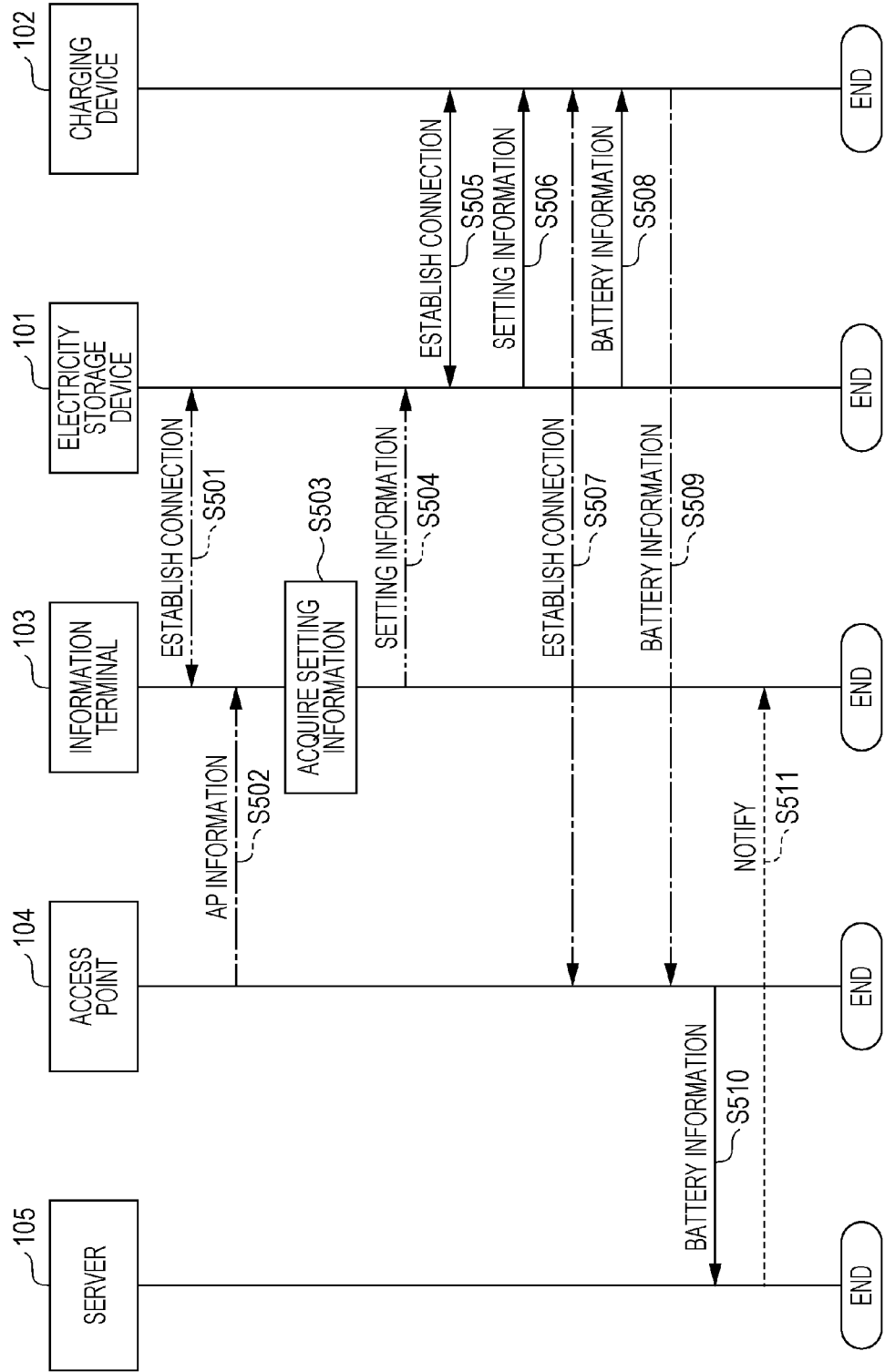
FIG. 7 is a sequence chart for explaining the operations of the electricity storage device, the charging device, and the like in the first specific example of the embodiment.

FIG. 7 is a sequence chart for explaining the operation of the electricity storage device 101, the charging device 102, and the like illustrated in FIG. 6. Note that, in FIG. 7, an arrow of an alternate long and short dash line indicates the Wi-Fi (registered trademark) communication, an arrow of an alternate long and two short dashes line indicates the BLE communication, an arrow of a solid line indicates the wired communication, and a dotted line indicates the wireless communication such as the LTE used in the mobile communication system.

In this example, first, the information terminal 103 and the electricity storage device 101 establish wireless connection of the BLE communication each other (S501). Subsequently, the access point 104 transmits the access point information, which is the information on the access point 104, to the information terminal 103. The information terminal 103 receives the access point information from the access point 104 (S502).

Subsequently, the information terminal 103 acquires setting information via the operation interface of the information terminal 103 (S503). The information terminal 103 may establish wireless connection of the Wi-Fi (registered trademark) communication with the access point 104 using the acquired setting information. Subsequently, the information terminal 103 transmits the setting information to the electricity storage device 101. The electricity storage device 101 receives the setting information from the information terminal 103 (S504).

Subsequently, the electricity storage device 101 is attached to the charging device 102, whereby the electricity storage device 101 and the charging device 102 establish connection of the wired communication each other (S505). Subsequently, the electricity storage device 101 transmits the setting information to the charging device 102. The charging device 102 receives the setting information from the electricity storage device 101 (S506).

Subsequently, the charging device 102 establishes the wired connection of the Wi-Fi (registered trademark) communication with the access point 104 using the setting information (S507). Subsequently, the electricity storage device 101 transmits the battery information indicating the state of the storage battery 111 to the charging device 102. The charging device 102 receives the battery information from the electricity storage device 101 (S508).

Subsequently, the charging device 102 transmits the battery information to the access point 104. The access point 104 receives the battery information from the charging device 102 (S509). Subsequently, the access point 104 transmits the battery information to the server 105. The server 105 receives the battery information from the access point 104 (S510). Subsequently, the server 105 notifies the information terminal 103 that the server 105 has received the battery information (S511).

Note that the establishment of the connection of the information terminal 103 and the electricity storage device 101 (S501) may be performed at any timing before communication is performed between the information terminal 103 and the electricity storage device 101. The establishment of the connection of the electricity storage device 101 and the charging device 102 (S505) may be performed at any timing before communication is performed between the electricity storage device 101 and the charging device 102.

The transmission of the battery information from the electricity storage device 101 to the charging device 102 (S508) may be performed at earlier any timing after the establishment of the connection of the electricity storage device 101 and the charging device 102 (S505). The transmission of the setting information from the electricity storage device 101 to the charging device 102 (S506) and the transmission of the battery information from the electricity storage device 101 to the charging device 102 (S508) may be simultaneously performed.

Figure 8:
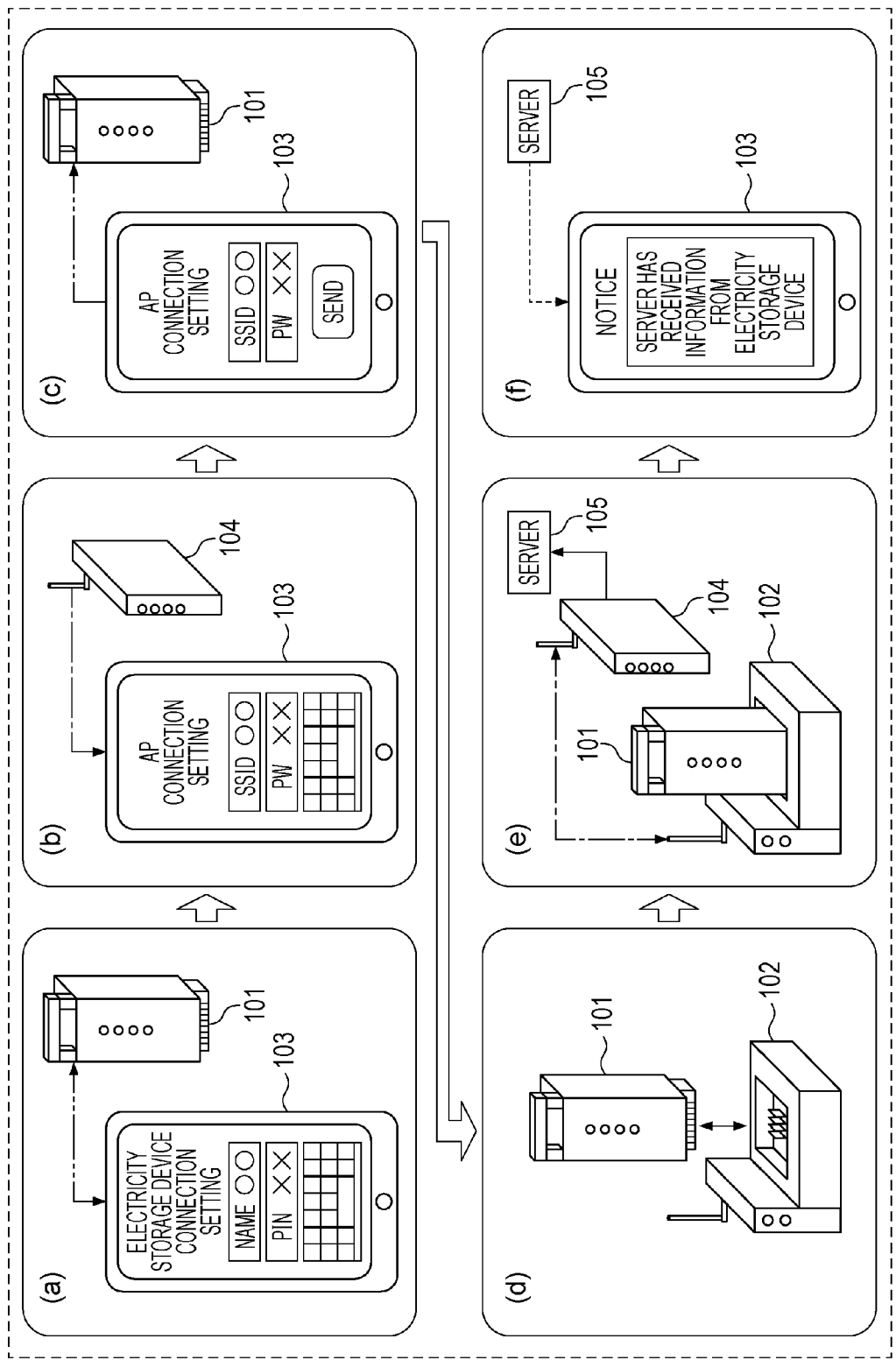
FIG. 8 illustrates conceptual diagrams for explaining the operations of the electricity storage device, the charging device, and the like in the first specific example of the embodiment.

FIG. 8 illustrates conceptual diagrams explaining the operations of the electricity storage device 101, the charging device 102, and the like illustrated in FIG. 6. Note that, in FIG. 8, as in FIG. 7, an arrow of an alternate long and short dash line indicates the Wi-Fi (registered trademark) communication, an arrow of an alternate long and two short dashes line indicates the BLE communication, an arrow of a solid line indicates the wired communication, and a dotted line indicates the wireless communication such as the LTE used in the mobile communication system.

FIG. 8(a) presents processing of S501 in FIG. 7. In this processing, the information terminal 103 receives an input of a name and a personal identification number (PIN) of the electricity storage device 101 via the operation interface. The information terminal 103 establishes wireless connection of the BLE communication with the electricity storage device 101 on the basis of the name and the PIN of the electricity storage device 101.

FIG. 8(b) presents processing of S502 and S503 in FIG. 7. In this processing, the access point 104 transmits the access point information, which is the information on the access point 104, to the information terminal 103. The information terminal 103 receives the access point information from the access point 104. The information terminal 103 acquires the setting information via the operation interface of the information terminal 103.

For example, the information terminal 103 receives an SSID for performing the Wi-Fi (registered trademark) communication with the access point 104 as the access point information and displays the SSID. The information terminal 103 receives an input of a password (PW) corresponding to the SSID for performing the Wi-Fi (registered trademark) communication with the access point 104. Consequently, the information terminal 103 acquires the setting information including the SSID and the password. Note that the access point information and the setting information may further include an authentication system and an encryption system.

FIG. 8(c) presents processing of S504 in FIG. 7. In this processing, the information terminal 103 receives operation of transmission of the setting information. The information terminal 103 transmits the setting information to the electricity storage device 101. The electricity storage device 101 receives the setting information from the information terminal 103.

FIG. 8(d) presents processing of S505 and S506 in FIG. 7. In this processing, the electricity storage device 101 is attached to the charging device 102. The electricity storage device 101 and the charging device 102 establish the wired communication each other. The electricity storage device 101 transmits the setting information to the charging device 102. The charging device 102 receives the setting information from the electricity storage device 101.

FIG. 8(e) presents processing of S507, S508, S509, and S510 in FIG. 7. In this processing, the charging device 102 establishes the wireless connection of the Wi-Fi (registered trademark) communication with the access point 104 using the setting information. The battery information is transmitted from the electricity storage device 101 to the server 105 via the charging device 102 and the access point 104.

FIG. 8(f) presents processing of S511 in FIG. 7. In this processing, the server 105 sends the information terminal 103 a notification that the server 105 has received the battery information. The information terminal 103 receives information of the notification and displays the information on the operation interface.

Note that the server 105 may send the information terminal 103, via the access point 104 a notification that the server 105 has received the battery information. That is, the server 105 may transmit the notification to the access point 104 through the wired communication. The access point 104 may transmit the received notification to the information terminal 103 through the Wi-Fi (registered trademark) communication.

In this specific example, the information terminal 103 receives the access point information from the access point 104 and acquires the setting information. The setting information is transmitted to the charging device 102 via the electricity storage device 101 and used for establishment of the wireless connection of the Wi-Fi (registered trademark) communication between the access point 104 and the charging device 102. Consequently, an environment of the wired communication for transmitting the battery information from the electricity storage device 101 to the server 105 is appropriately constructed.

Thereafter, since the battery information is transmitted from the electricity storage device 101 to the server 105 via the charging device 102, the server 105 can collect the battery information during the charging of the electricity storage device 101. Therefore, the server 105 can monitor a state of the charging of the electricity storage device 101.

Second Specific Example

Figure 9:
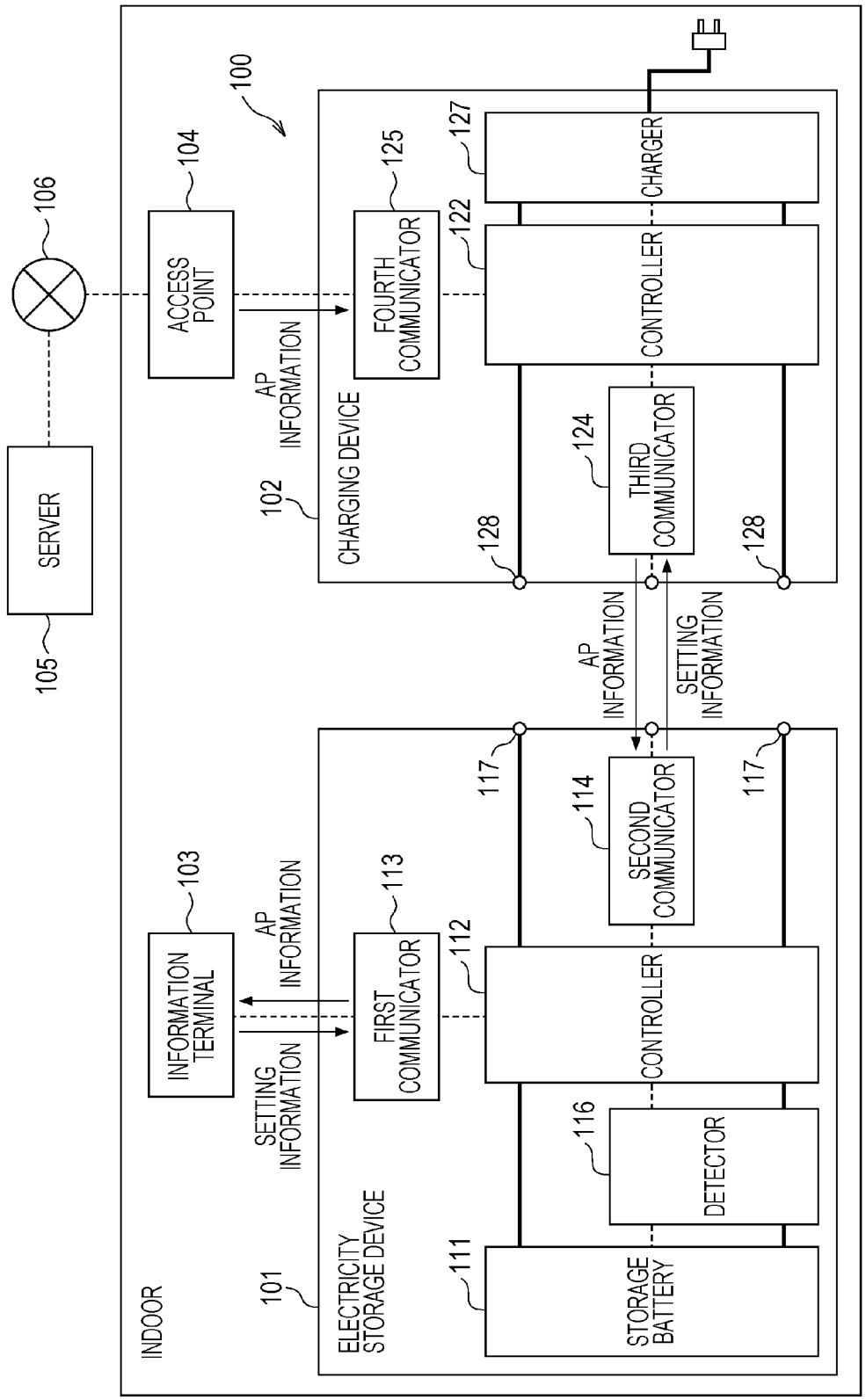
FIG. 9 is a block diagram of the wireless connection setting system in a second specific example of the embodiment.

FIG. 9 is a block diagram illustrating the second specific example of the wireless connection setting system 100 illustrated in FIG. 1. Note that, in FIG. 9, as in FIG. 6, dotted lines among the components indicate a transmission path of the wired communication or the wireless communication. Thick lines among the components indicate a power line.

The configuration in this specific example is basically the same as the configuration in the first specific example. However, in this specific example, the information terminal 103 does not have to be capable of communicating with the access point 104. That is, the information terminal 103 does not have to be capable of performing the Wi-Fi (registered trademark) communication.

In the first specific example, the access point information, which is the information on the access point 104, is directly transmitted from the access point 104 to the information terminal 103. On the other hand, in this specific example, the access point information is transmitted from the access point 104 to the information terminal 103 via the charging device 102 and the electricity storage device 101.

More specifically, the fourth communicator 125 of the charging device 102 receives the access point information (AP information), which is the information on the access point 104, from the access point 104. The fourth communicator 125 of the charging device 102 may receive the access point information through communication for establishing the wireless connection of the Wi-Fi (registered trademark) communication between the charging device 102 and the access point 104.

The third communicator 124 of the charging device 102 transmits the access point information to the electricity storage device 101 through the wired communication. The second communicator 114 of the electricity storage device 101 receives the access point information from the charging device 102 through the wired communication. The electricity storage device 101 transmits the access point information to the information terminal 103 through the BLE communication. The information terminal 103 receives the access point information from the electricity storage device 101 through the BLE communication.

As in the first specific example, the information terminal 103 acquires the setting information on the basis of, for example, an input to the operation interface of the information terminal 103.

The information terminal 103 transmits the setting information to the electricity storage device 101 through the BLE communication. The first communicator 113 of the electricity storage device 101 receives the setting information from the information terminal 103 through the BLE communication. The second communicator 114 of the electricity storage device 101 transmits the setting information to the charging device 102 through the wired communication. The third communicator 124 of the charging device 102 receives the setting information from the electricity storage device 101 through the wired communication. The fourth communicator 125 of the charging device 102 establishes the wireless connection of the Wi-Fi (registered trademark) communication between the charging device 102 and the access point 104 using the setting information.

Consequently, even if the information terminal 103 cannot perform the Wi-Fi (registered trademark) communication, the information terminal 103 can acquire the access point information via the charging device 102 and the electricity storage device 101.

Thereafter, as in the first specific example, the information terminal 103 can acquire the setting information. The setting information is transmitted from the information terminal 103 to the charging device 102 via the electricity storage device 101. The charging device 102 can establish the wireless connection of the Wi-Fi (registered trademark) communication with the access point 104 using the setting information transmitted to the charging device 102.

FIG. 10 is a sequence chart for explaining the operations of the electricity storage device 101, the charging device 102, and the like illustrated in FIG. 9. Note that, in FIG. 10, as in FIG. 7, an arrow of an alternate long and short dash line indicates the Wi-Fi (registered trademark) communication, an arrow of an alternate long and two short dashes line indicates the BLE communication, an arrow of a solid line indicates the wired communication, and a dotted line indicates the wireless communication such as the LTE used in the mobile communication system.

In this example, first, the information terminal 103 and the electricity storage device 101 establish the wireless connection of the BLE communication each other (S601). Subsequently, the electricity storage device 101 is attached to the charging device 102, whereby the electricity storage device 101 and the charging device 102 establish the connection of the wired communication each other (S602).

Subsequently, the access point 104 transmits the access point information, which is the information on the access point 104, to the charging device 102. The charging device 102 receives the access point information from the access point 104 (S603). Subsequently, the charging device 102 transmits the access point information to the electricity storage device 101. The electricity storage device 101 receives the access point information from the charging device 102 (S604).

Subsequently, the electricity storage device 101 transmits the access point information to the information terminal 103. The information terminal 103 receives the access point information from the electricity storage device 101 (S605). Subsequently, the information terminal 103 acquires the setting information via the operation interface of the information terminal 103 (S606). The information terminal 103 may establish the wireless connection of the Wi-Fi (registered trademark) communication with the access point 104 using the acquired setting information.

Subsequently, the information terminal 103 transmits the setting information to the electricity storage device 101. The electricity storage device 101 receives the setting information from the information terminal 103 (S607). Subsequently, the electricity storage device 101 transmits the setting information to the charging device 102. The charging device 102 receives the setting information from the electricity storage device 101 (S608).

Subsequently, the charging device 102 establishes the wireless connection of the Wi-Fi (registered trademark) communication with the access point 104 using the setting information (S609). Subsequently, the electricity storage device 101 transmits the battery information indicating the state of the storage battery 111 to the charging device 102. The charging device 102 receives the battery information from the electricity storage device 101 (S610).

Subsequently, the charging device 102 transmits the battery information to the access point 104. The access point 104 receives the battery information from the charging device 102 (S611). Subsequently, the access point 104 transmits the battery information to the server 105. The server 105 receives the battery information from the access point 104 (S612). Subsequently, the server 105 notifies the information terminal 103 that the server 105 has received the battery information (S613).

Note that the establishment of the connection between the information terminal 103 and the electricity storage device 101 (S601) may be performed at any timing before the communication is performed between the information terminal 103 and the electricity storage device 101. The establishment of the connection between the electricity storage device 101 and the charging device 102 (S602) may be performed at any timing before the communication is performed between the electricity storage device 101 and the charging device 102.

The transmission of the battery information from the electricity storage device 101 to the charging device 102 (S610) may be performed at earlier any timing after the establishment of the connection between the electricity storage device 101 and the charging device 102 (S602). The transmission of the setting information from the electricity storage device 101 to the charging device 102 (S608) and the transmission of the battery information from the electricity storage device 101 to the charging device 102 (S610) may be simultaneously performed.

FIG. 11 illustrates conceptual diagrams for explaining the operations of the electricity storage device 101, the charging device 102, and the like illustrated in FIG. 9. Note that, in FIG. 11, as in FIG. 10, an arrow of an alternate long and short dash line indicates the Wi-Fi (registered trademark) communication, an arrow of an alternate long and two short dashes line indicates the BLE communication, an arrow of a solid line indicates the wired communication, and a dotted line indicates the wireless communication such as the LTE used in the mobile communication system.

FIG. 11(a) presents processing of S601 in FIG. 10. In this processing, the information terminal 103 receives an input of a name and a PIN of the electricity storage device 101 via the operation interface. The information terminal 103 establishes the wireless connection of the BLE communication with the electricity storage device 101 on the basis of the name and the PIN of the electricity storage device 101.

FIG. 11(b) presents processing of S602 in FIG. 10. In the processing, the electricity storage device 101 is attached to the charging device 102. The electricity storage device 101 and the charging device 102 establish the connection of the wired communication each other.

FIG. 11(c) presents processing of S603, S604, S605, S606, S607, and S608 in FIG. 10. In this processing, the access point 104 transmits the access point information, which is the information on the access point 104, to the charging device 102. The charging device 102 receives the access point information from the access point 104.

The charging device 102 transmits the access point information to the electricity storage device 101. The electricity storage device 101 receives the access point information from the charging device 102. The electricity storage device 101 transmits the access point information to the information terminal 103. The information terminal 103 receives the access point information from the electricity storage device 101.

The operation of the information terminal 103 after receiving the access point information from the electricity storage device 101 is the same as the operation in the first specific example. Specifically, the information terminal 103 receives the setting information via the operation interface of the information terminal 103.

For example, the information terminal 103 receives an SSID for performing the Wi-Fi (registered trademark) communication with the access point 104 as the access point information and displays the SSID. The information terminal 103 receives an input of a password (PW) corresponding to the SSID for performing the \Wi-Fi (registered trademark) communication with the access point 104. Consequently, the information terminal 103 receives the setting information including the SSID and the password. Note that the access point information and the setting information may further include an authentication system and an encryption system.

The information terminal 103 receives operation of transmission of the setting information. The information terminal 103 transmits the setting information to the electricity storage device 101. The electricity storage device 101 receives the setting information from the information terminal 103. The electricity storage device 101 transmits the setting information to the charging device 102. The charging device 102 receives the setting information from the electricity storage device 101.

FIG. 11(*d*) presents processing of S609, S610, S611, and S612 in FIG. 10. In this processing, the charging device 102 establishes the wireless connection of the Wi-Fi (registered trademark) communication with the access point 104 using the setting information. The battery information is transmitted from the electricity storage device 101 to the server 105 via the charging device 102 and the access point 104.

FIG. 11(*e*) presents processing of S613 in FIG. 10. In this processing, the server 105 sends the information terminal 103 a notification that the server 105 has received the battery information. The information terminal 103 receives information of the notification and displays the information.

Note that the server 105 may transmit, to the information terminal 103, via the access point 104, the notification that the server 105 has received the battery information. That is, the server 105 may transmit the notification to the access point 104 through the wired communication. The access point 104 may transmit the received notification to the information terminal 103 through the Wi-Fi (registered trademark) communication.

In this specific example, the information terminal 103 receives the access point information from the access point 104 via the charging device 102 and the electricity storage device 101 and acquires the setting information. The setting information is transmitted to the charging device 102 via the electricity storage device 101 and used for establishment of the wireless connection of the Wi-Fi (registered trademark) communication between the access point 104 and the charging device 102. Consequently, an environment of wireless communication for transmitting the battery information from the electricity storage device 101 to the server 105 is appropriately constructed.

In the first specific example, the information terminal 103 directly receives the access point information from the access point 104 through the Wi-Fi (registered trademark) communication or the like in a state in which the wireless connection is not established. Therefore, the information terminal 103 can more simply acquire the access point information.

In the second specific example, the information terminal 103 receives the access point information from the access point 104 via the charging device 102 and the electricity storage device 101. Therefore, even if the information terminal 103 cannot perform the Wi-Fi (registered trademark) communication, the information terminal 103 can acquire the access point information. For example, the information terminal 103 can acquire the access point information at appropriate timing such as timing when the electricity storage device 101 is attached to the charging device 102.

Concerning the first specific example and the second specific example, wireless connection of the BLE communication between the electricity storage device 101 and the information terminal 103 may be established in advance in order to transmit the battery information from the electricity storage device 101 to the information terminal 103. The wireless connection established in advance between the electricity storage device 101 and the information terminal 103 may be used to establish wireless connection between the charging device 102 and the access point 104.

Wireless connection of the Wi-Fi (registered trademark) communication may be established in advance between the information terminal 103 and the access point 104 for the information terminal 103 to access the communication network 106 and the like. The wireless connection established in advance between the information terminal 103 and the access point 104 may be used in order to establish the wireless connection between the charging device 102 and the access point 104.

For example, the information terminal 103 may store setting information for the Wi-Fi (registered trademark) communication with the access point 104 in advance. In order to establish the wireless connection between the charging device 102 and the access point 104, the information terminal 103 may transmit the setting information stored in advance to the electricity storage device 101 without receiving an input of setting information anew. In that case, the information terminal 103 may receive an input of an instruction for transmission and transmit the setting information stored in advance to the electricity storage device 101.

The Wi-Fi (registered trademark) communication and the BLE communication are examples. Other communication systems may be used. However, the portable electricity storage device 101 cannot always obtain sufficient electric power for communication compared with the charging device 102 set indoors. Therefore, power consumption of the second communicator 114 of the electricity storage device 101 is desirably smaller than power consumption of the third communicator 124 of the charging device 102.

As explained above, construction of an environment for using wireless communication is assisted by the electricity storage device and the like in the present disclosure.

Note that, in the embodiment, the components may be configured be dedicated hardware or may be realized by executing a software program suitable for the components. The components may be realized by a program executer such as a CPU or a processor reading out and executing a software program recorded in a recording medium such as a hard disk or a semiconductor memory. Software for realizing the electricity storage device in the embodiment is a computer program explained below.

That is, the computer program causes a computer to execute a method of controlling an electricity storage device, the method including: receiving a wireless setting value for a charging device to establish wireless connection to a specific access point, from an information terminal via a first communicator that performs wireless communication with the information terminal; and transmitting the wireless setting value to the charging device via a second communicator, which is a communicator communicably connected to the charging device and performing wired communication with the charging device when the electricity storage device is attached to the charging device.

Alternatively, the computer program causes a computer to execute a method of controlling a charging device, the method including: receiving a wireless setting value for the charging device to establish wireless connection to a specific access point, from an electricity storage device, via a third communicator which is a communicator communicably connected to an electricity storage device and performing wired communication with the electricity storage device when the charging device is attached to the electricity storage device; and causing a fourth communicator, which performs wireless communication with an access point, to establish the wireless connection to the specific access point using the wireless setting value.

In the embodiment explained above, the components may be circuits. A plurality of components may configure one circuit as a whole or may respectively configure separate circuits. Each of the circuits may be a general-purpose circuit or may be a dedicated circuit.

The electronic storage device and the like according to one or more aspects are explained above on the basis of the embodiment. However, the present disclosure is not limited to this embodiment. This embodiment applied with various modifications conceivable by those skilled in the art and forms constructed by combining components in different embodiments may be included in a scope of one or the plurality of aspects without departing from the spirit of the present disclosure.

For example, in the embodiment, processing executed by a specific component may be executed by another component instead of the specific component. The order of a plurality of kinds of processing may be changed or the plurality of kinds of processing may be executed in parallel.

The present disclosure is usable in an electricity storage device, a charging device, and the like and is applicable to a charging system for the electricity storage device, a management system for the electricity storage device, and the like.

What is claimed is:

1. An electric storage device comprising:
 a storage battery charged by a charging device;
 a first connector that detachably connects the electricity storage device including the storage battery with the charging device;
 a first communicator that performs wireless communication with an information terminal;
 a second communicator that performs wired communication with the charging device when the electricity storage device is attached to the charging device via the first connector; and
 a controller that causes, when the first communicator receives, from the information terminal, a wireless setting value for the charging device to establish wireless connection to a specific access point, the second communicator to transmit the wireless setting value to the charging device.

2. The electric storage device according to claim 1, wherein the first communicator is a communicator that performs Bluetooth (registered trademark) low energy (BLE) communication.

3. The electric storage device according to claim 1, wherein when the second communicator receives information on the specific access point from the charging device, the controller causes the first communicator to transmit the information on the specific access point to the information terminal.

4. A method comprising:
 receiving a wireless setting value for a charging device to establish wireless connection to a specific access point, from an information terminal via a first communicator which is provided in an electricity storage device, and is performing wireless communication with the information terminal; and
 transmitting the wireless setting value to the charging device via a second communicator which is provided in the electricity storage device, and is performing wired communication with the charging device when the electricity storage device is attached to the charging device via a first connector that detachably connects the electricity storage device with the charging device.

5. The method according to claim 4, wherein the first communicator is a communicator that performs Bluetooth (registered trademark) low energy (BLE) communication.

6. The method according to claim 4, further comprising:
 receiving information on the specific access point from the charging device via the second communicator; and
 transmitting the information on the specific access point to the information terminal via the first communicator.

7. A charging device comprising:
 a charger that charges an electricity storage device by supplying electric power to the electricity storage device;
 a second connector that detachably connects the charging device including the charger with the electricity storage device;
 a third communicator that performs wired communication with the electricity storage device when the electricity storage device is attached to the charging device via the second connector;
 a fourth communicator that performs wireless communication with an access point; and
 a controller that causes, when the third communicator receives, from the electricity storage device, a wireless setting value for the charging device to establish wireless connection to a specific access point, the fourth communicator to establish the wireless connection to the specific access point using the wireless setting value.

8. The charging device according to claim 7, wherein the fourth communicator is a communicator that performs Wi-Fi (registered trademark) communication.

9. The charging device according to claim 7, wherein the controller causes, when the fourth communicator receives information on the specific access point from the specific access point, the third communicator to transmit the information on the specific access point to the electricity storage device.

10. A method comprising:
 receiving a wireless setting value from an electricity storage device via a third communicator which is provided in a charging device, and is performing wired communication with the electricity storage device at a time when the electricity storage device is attached to the charging device via a second connector that detachably connects the charging device and the electricity storage device; and
 causing a fourth communicator to establish the wireless connection to the specific access point using the wireless setting value, the fourth communicator provided in the charging device, and performing wireless communication with an access point.

11. The method according to claim 10, wherein the fourth communicator is a communicator that performs Wi-Fi (registered trademark) communication.

12. The method according to claim 10, further comprising:
   receiving information on the specific access point from the specific access point via the fourth communicator; and
   transmitting the information on the specific access point to the electricity storage device via the third communicator.

13. A system comprising:
   a charging device; and
   an electricity storage device attached to the charging device, wherein
   the electricity storage device includes:
      a storage battery charged by the charging device;
      a first connector that detachably connects the electricity storage device including the storage battery with the charging device;
      a first communicator that performs wireless communication with an information terminal;
      a second communicator that performs wired communication with the charging device when the electricity storage device is attached to the charging device via the first connector; and
      a first controller that causes, when the first communicator receives, from the information terminal, a wireless setting value for the charging device to establish wireless connection to a specific access point, the second communicator to transmit the wireless setting value to the charging device, and
   the charging device includes:
      a charger that charges the electricity storage device by supplying electric power to the electricity storage device;
      a second connector that detachably connects the charging device including the charger with the electricity storage device;
      a third communicator that performs wired communication with the electricity storage device when the electricity storage device is attached to the charging device via the second connector;
      a fourth communicator that performs wireless communication with an access point; and
      a second controller that causes, when the third communicator receives the wireless setting value from the electricity storage device, the fourth communicator to establish the wireless connection to the specific access point using the wireless setting value.

14. The system according to claim 13, wherein power consumption of the first communicator is smaller than power consumption of the fourth communicator.

15. The system according to claim 14, wherein
   the first communicator is a communicator that performs Bluetooth (registered trademark) low energy (BLE) communication, and
   the fourth communicator is a communicator that performs Wi-Fi (registered trademark) communication.

16. The system according to claim 13, wherein
   when the fourth communicator receives information on the specific access point from the specific access point, the second controller causes the third communicator to transmit the information on the specific access point to the electricity storage device, and
   when the second communicator receives the information on the specific access point from the charging device, the first controller causes the first communicator to transmit the information on the specific access point to the information terminal.

* * * * *